United States Patent [19]

Baversten

[11] Patent Number: 5,329,563
[45] Date of Patent: Jul. 12, 1994

[54] CONTROL ROD LATCH TOOL
[75] Inventor: Bengt I. Baversten, Weatogue, Conn.
[73] Assignee: Combustion Engineering Inc., Windsor, Conn.
[21] Appl. No.: 98,887
[22] Filed: Jul. 29, 1993
[51] Int. Cl.⁵ .................. G21C 7/00; G21C 19/00
[52] U.S. Cl. .................................. 376/260; 376/262
[58] Field of Search .................... 376/233, 260, 262

[56] References Cited
U.S. PATENT DOCUMENTS

4,086,132  4/1978  Meuschke et al. ............. 376/262
5,241,570  8/1993  Challberg ...................... 376/260

Primary Examiner—Daniel D. Wasil
Attorney, Agent, or Firm—Ronald P. Kananen; John H. Mulholland

[57] ABSTRACT

A latch tool features two elongate arms which extend down along either side of a control rod. Rotatable actuating rods are mounted on the arms. The upper ends of the actuating rods are provided with cranks which engage in slots formed in an actuating disc. As the disc is rotated, the cranks rotate the actuating rods and swing cam-like members, which are fixed to the rods, into position under an unlatching handle. In the preferred embodiments, the actuating disc is threaded onto the exterior of a rotatable input member, so that after the cam-like members are swung into position, the actuating disc threads its way up the input member in a manner which pulls the cam-like members upwardly and pulls the unlatching handle. In addition to the cam-like members which actuate the unlatching handle, lifting cam-like members may additionally be provided to fit in under a lifting handle of the control rod, and facilitate lifting of the control rod out of its position.

7 Claims, 13 Drawing Sheets

CONTROL ROD LATCH TOOL

BACKGROUND OK THE INVENTION

1. Field of the Invention

The present invention relates generally to controls rods of a nuclear reactor. More specifically, the present invention relates to a control rod latch tool which facilitates the release and removal of the control rods when replacement is required.

2. Description of the Relevant Art

Figure 1:
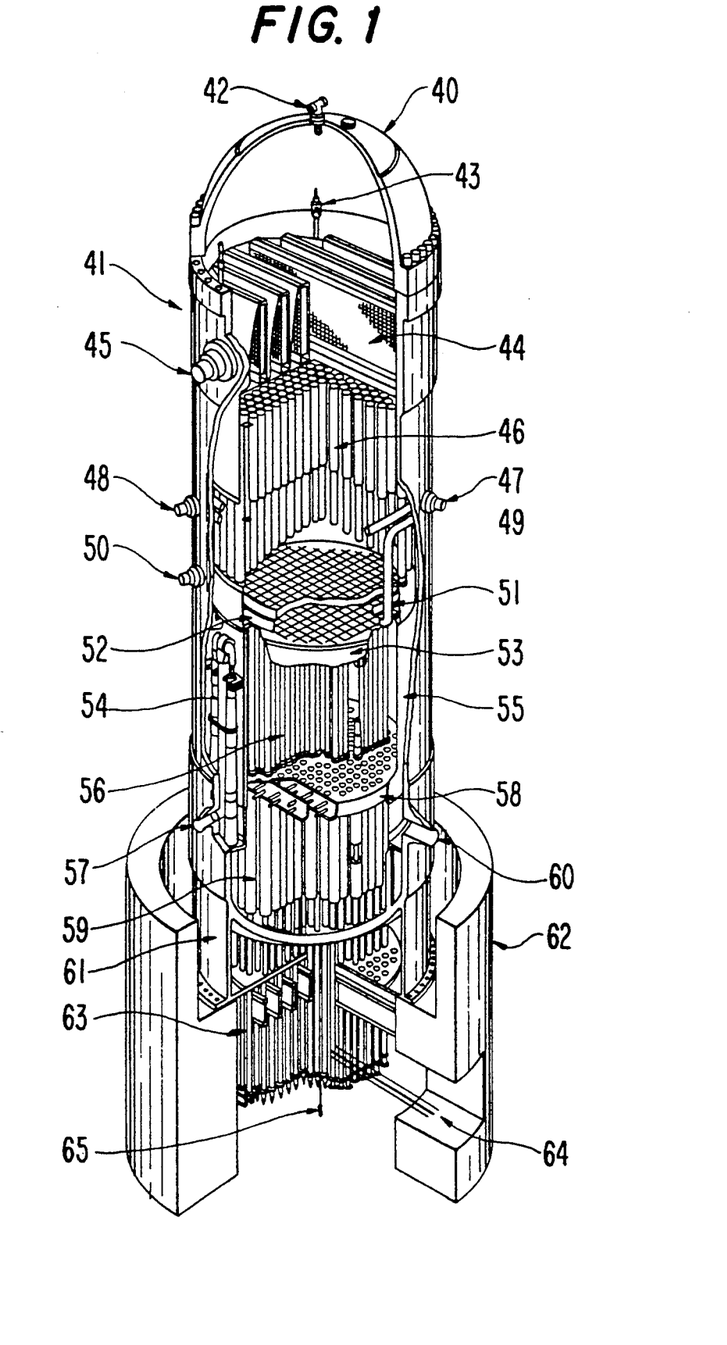
FIG. 1 is a cut-away perspective view showing a BWR reactor of the type to which the present invention is applicable.

FIG. 1 is a perspective partially cut-away view of a boiling water reactor of the type to which the present invention is applicable. This BWR (boiling water reactor) includes, merely by way of example, a head 40 which is secured to the top of the reactor vessel 41, a vent and head spray 42, a steam dryer lifting lug 43, a steam drier assembly 44, a steam outlet 45, a steam separator assembly 46, a feedwater inlet 47, a core spray inlet 48, a feedwater sparger 49, a low pressure coolant injection inlet 50, a core spray line 51, a core sprayer sparger 52, a top guide 53, a jet pump assembly 54, a core shroud 55, fuel assemblies 56, a jet pump/recirculation water inlet 57, a core plate 58, control rods 59 (enclosed in elongate tubular guide thimbles), a recirculation water outlet 60, a vessel support skirt 61, a shield wall 62, control rod drive mechanisms 63, control rod drive hydraulic lines 64, and an in-core flux monitor 65.

In this type of BWR the control rods 59 have an essentially cruciform cross-section, and, in order to facilitate refueling (viz., replacement of the fuel assemblies), are disposed at the bottom of the reactor vessel in a manner wherein they can be selectively moved up between the fuel rod assemblies by the hydraulically operated locking piston type control rod drive mechanisms 63.

Figure 2:
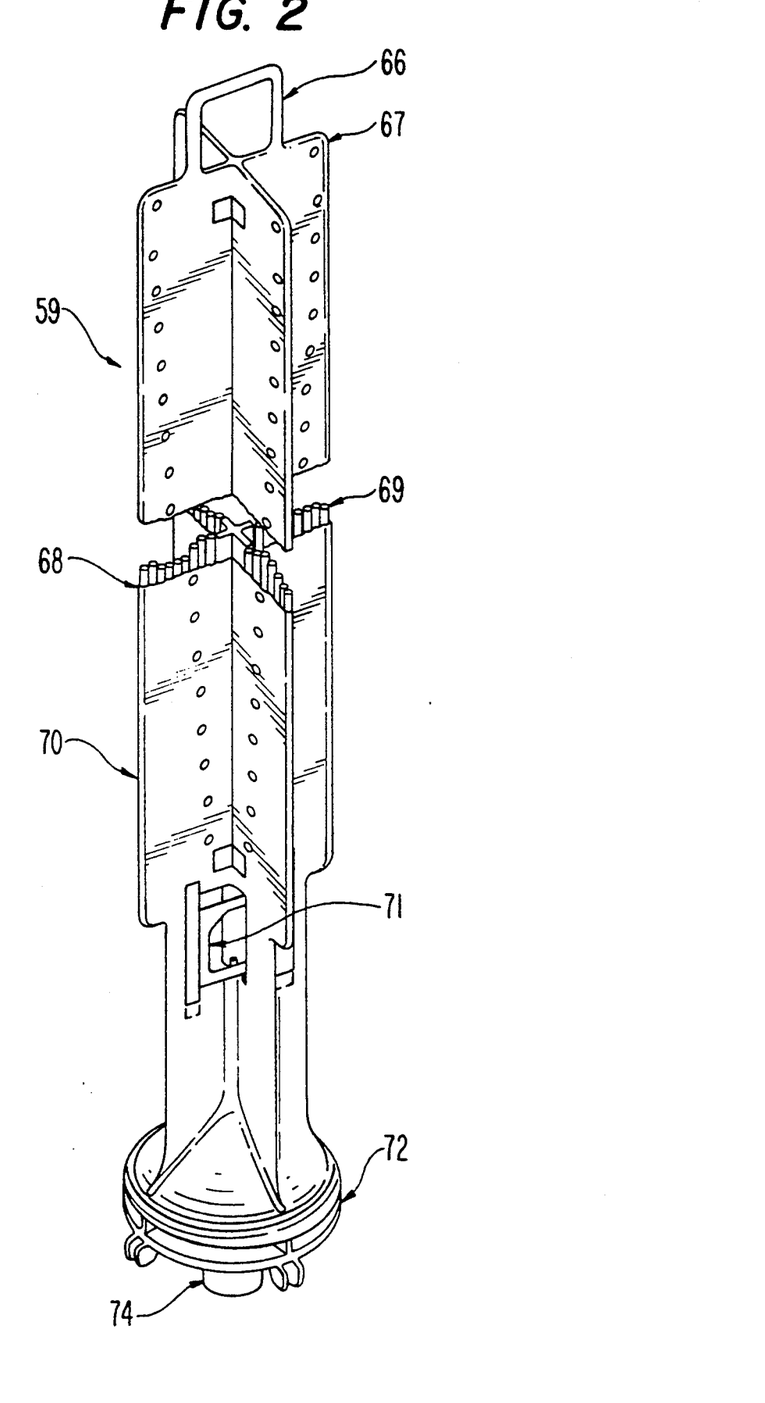
FIG. 2 is a partially cut-away perspective view of a control rod of the type which is used in the type of reactor shown in FIG. 1, and which can be released through the application of the present invention.

FIG. 2 shows an example of a control rod 59 which is used in this type of reactor. This illustrated arrangement includes a lifting handle 66, upper guide rollers 67, a sheath 68, a plurality of neutron absorbing rods 69 enclosed in the sheath to define four blades 70, a coupling release or unlatching handle 71, a velocity limiter 72, lower guide rollers 73, and a coupling socket 74.

Figures 3, 4:
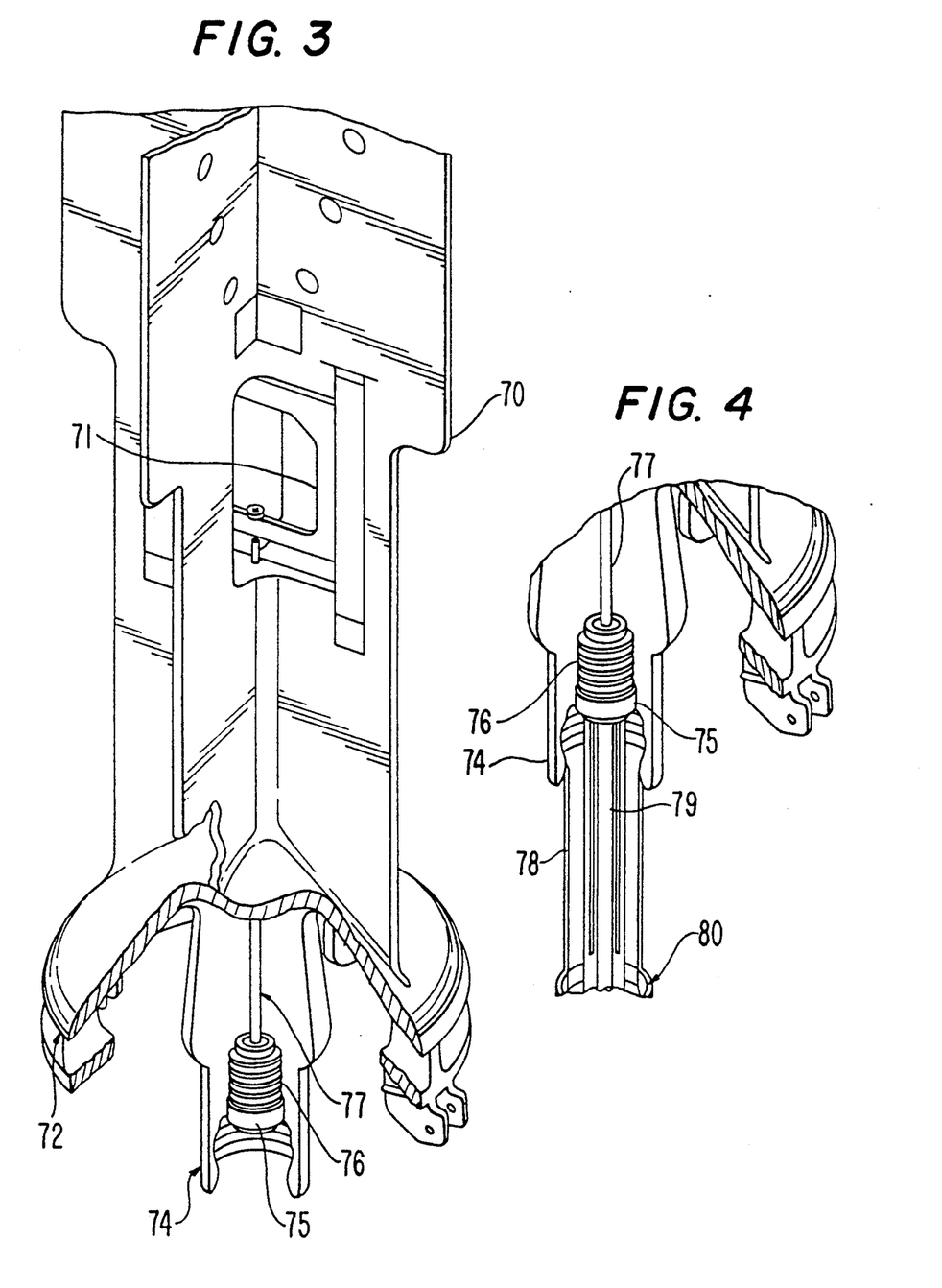
FIG. 3 is a perspective view showing details of the lower end of the control rod shown in FIG. 2.
FIG. 4 is an enlarged view of a socket which forms part of the control rod, showing the manner in which an operative connection is established between the control rod and the control rod drive.

Details of the construction of the lower portion of a fuel rod is shown in FIGS. 3 and 4. As shown, the coupling socket 74 houses a lock plug 75 and a lock plug return spring 76 which are arranged at the lower end of an actuating shaft 77. When coupled to a control rod drive, the coupling socket 74 is arranged to operatively engage with a spud 78, and an unlocking tube 79 which extend up from an index tube—drive 80, in the manner illustrated in FIG. 4.

In order to disconnect a control rod 59 of the above described nature from an associated control rod drive, it is necessary to raise the unlatching handle 71. This releases the coupling arrangement shown in FIG. 4 and allows the control rod 59 to be lifted by the lifting handle 66 located at the top of the rod, up and out of the reactor vessel 41.

As is well known, when a reactor of the illustrated type is opened for refueling or maintenance, the vessel 41 is flooded with water in order to suppress radioactive emissions. This, in combination with the fact that the control rods 59 are located deep in the reactor vessel 41, as will be appreciated from FIG. 1, renders access very difficult. Nevertheless, it is required to be able to periodically remove the control rods and/or the control rod drives from the reactor vessel.

FIGS. 5 to 10 show an existing latch tool which is used to lift the unlatching handle and release the control rod 59 from its respective control rod drive.

Figure 5:
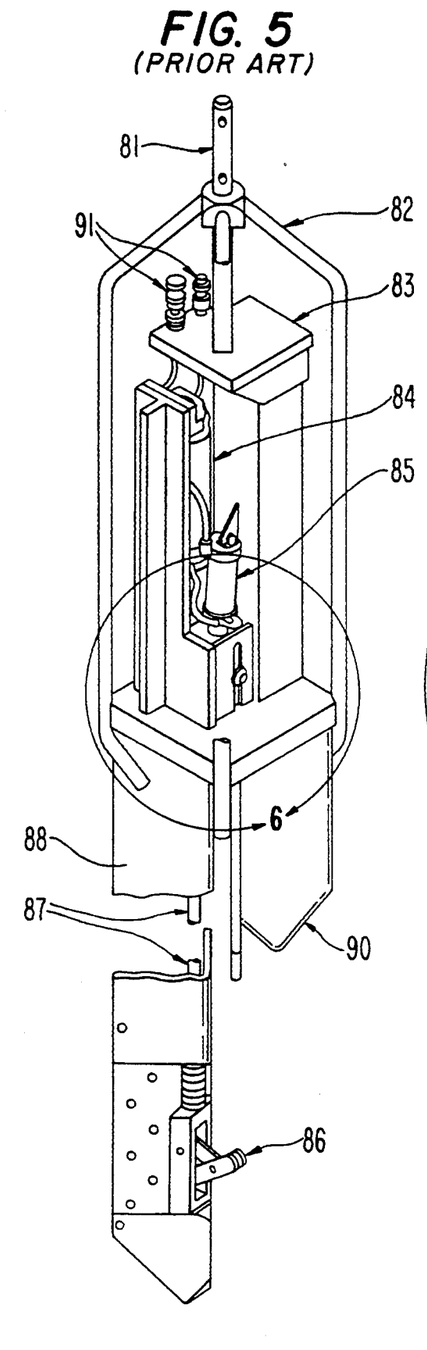
FIG. 5 is a perspective view showing a currently used tool which is used to release the control rods from their respective control rod drives.

This tool basically comprises a stud 81 which extends upward from a frame 82 for connection to a crane line, a tube assembly 83, an actuator link air cylinder 84, a lifting hook air cylinder 85, and an actuator link 86 which is adapted to engage the unlatching handle 71. The actuator link 86 is operatively connected with the air cylinder 84 by way of an actuator rod 87. As shown, the actuator link 86 is supported near the bottom of a V-cross-section structural member 88.

Figure 6:
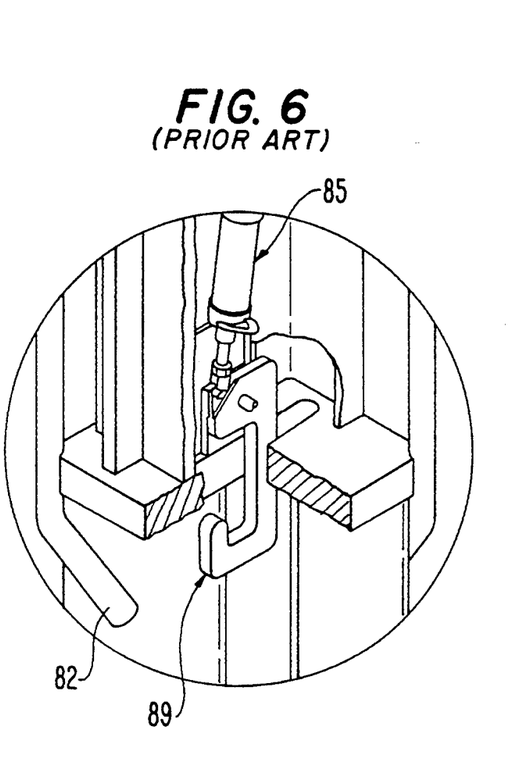
FIG. 6 is a cut-away view showing details of a lifting hook assembly which forms a vital part of the tool shown in FIG. 5.
Figures 7, 8:
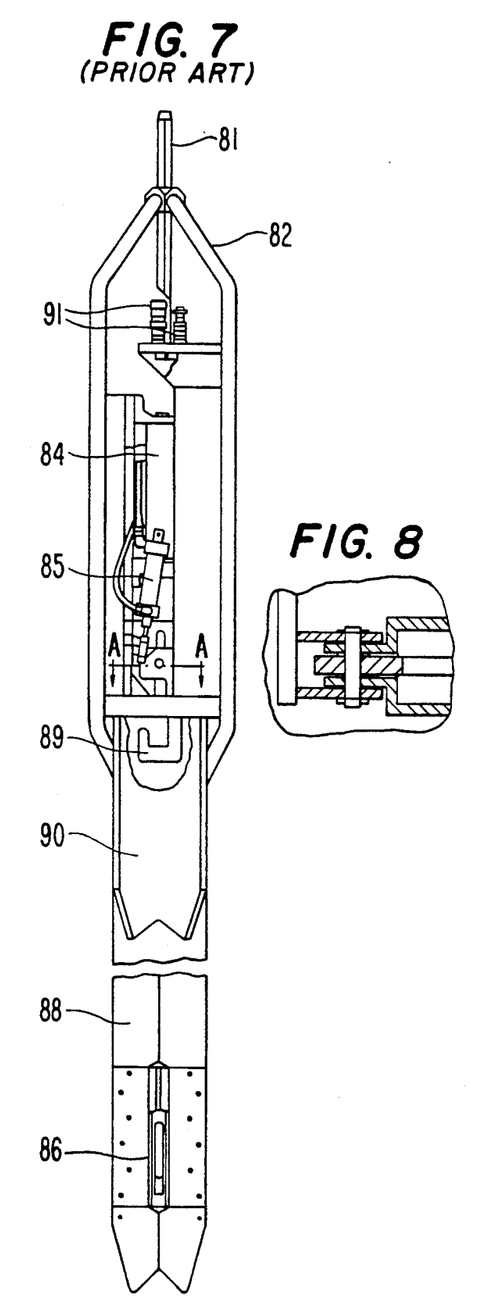
FIG. 7 is a front elevational view of the tool shown in FIG. 5.
FIG. 8 is a sectional view as taken along section line A—A of FIG. 7.
Figure 9:
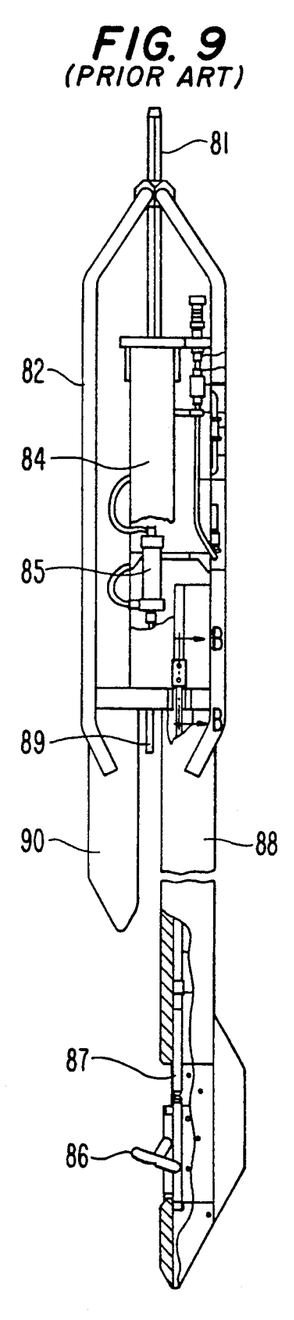
FIG. 9 is a side elevational view of the tool.
Figure 10:
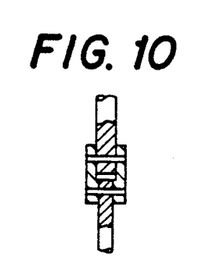
FIG. 10 is a sectional view as taken along section line B—B of FIG. 9.

Details of a lifting hook structure 89 and the manner in which it is pivotally mounted and connected with the lifting hook air cylinder 85 are illustrated in FIG. 6.

In order that the actuator link 86 be accurately located, the arrangement is provided with a short blade-shaped back guide member 90. Accordingly, when this tool 100 is put into use, the tool engages the unlatching handle of the control rod 59 from one side while the back guide 90 provides an aligning function on the other. The actuator link air cylinder 84 and the lifting hook cylinder 85 are supplied with air under pressure by way of air connectors 91.

However, with this existing type of arrangement it is necessary for the fuel support piece to be removed before suitable disposition and alignment of the tool can be achieved. This removal is quite time consuming. Accordingly, it has been proposed to remove the back guide 90, from the latch tool in order enable its use without the need to remove the fuel support piece. However, this measure has not met with success in that, without the back guide tool engagement is unreliable and results in problems with the engagement to the unlatching handle.

An alternate technique which has been proposed in order to save time and avoid the handling problems related with the removal of the fuel support piece, is such as to use a J-hook which is suspended from a cable, to unlatch the control rod 59.

However, this technique suffers from the drawbacks that, as the unlatching handle is submerged in approximately 60 feet of water, in order for the operator to be able to observe the hook and control the maneuvering of the same, it is necessary to utilize a TV camera and immerse it to essentially the same depth as the hook.

Correct positioning of both the hook and the camera is time consuming, requires at least two operators and requires a certain amount of experience and skill.

SUMMARY OF THE INVENTION

It is an object of the present invention to provide a new control rod latch tool which simplifies the unlatching of a control rod from its associated control rod drive.

It is a further object of the present invention to provide a control rod latching tool which can be used for both unlatching and lifting the control rods.

A further object of the present invention to provide a control rod latch tool which enables the tool to be placed in position on a control rod without the need to remove the fuel support pieces first.

In brief, the above objects are achieved by a latch tool which features two elongate arms which extend down along either side of a control rod. Rotatable actuating rods are mounted on the arms. The upper ends of the actuating rods are provided with cranks which engage in slots formed in an actuating disc. As the disc is rotated, the cranks rotate the actuating rods and swing cam-like members, which are fixed to the rods into position under an unlatching handle. In the preferred embodiments, the actuating disc is threaded onto the exterior of a rotatable input member, so that after the cam-like members are swung into position, the actuating disc threads its way up the input member without undergoing any rotation and in a manner which pulls the cam-like members upwardly and lifts the unlatching handle.

More specifically, a first aspect of the present invention resides in a tool which is designed to facilitate the unlatching of control rods from a control rod drive, and which features: a rotatable adapter member through which rotational energy can be input; an actuator disc operatively connected with the rotatable member so that rotation of the rotatable adapter member induces rotation of the actuator disc, the actuator disc having an elongate slot formed therein; and an actuator shaft having a crank at a first end and a cam-like member at a second end, the crank being received in the elongate slot so that rotation of the actuator disc induces the actuator shaft to rotate and cause the cam-like member to rotate through a predetermined angle.

A second aspect of the present invention resides in a tool for use in a nuclear reactor and which can be lowered onto an essentially cruciform cross-section control rod having a lift handle at the top and an unlatching handle arranged near the bottom, the control rod being releasably connected with a control rod drive by a connection mechanism which is operatively connected with the unlatching handle, the tool comprising: first and second arms which extend down along opposite sides of the control rod from a cross-member which is seatable on the top of the control rod; first and second actuator rods which are supported on the first and second arms; first and second cam-like members which are fixed to the first and second actuator rods, respectively; a rotatable drive input member which is rotatably mounted on the cross member; and crank means operatively interconnecting the input member with the first and second actuating rods, for selectively inducing the first and second actuator rods to rotate and to induce the first and second cam-like members to engage and then lift the unlatching handle.

As will be appreciated from the above, features which characterize the present invention reside in that the tool can be placed in an operative position without the need to remove the fuel support piece and when lowered down onto the control rod, becomes symmetrically located on both side of the control rod, in a manner which prevents separation of the control rod and the latch tool. This of course ensures reliable engagement with the unlatching handle. As the tool is used with a so called "rigid pole" system, precise location and operation is facilitated. The engagement, unlatching movement, and disengagement of the tool is easily carried out, without the need for air cylinders and valves, by a single operator who only needs to rotate the rigid pole through a number of turns.

BRIEF DESCRIPTION OF THE DRAWINGS

The various features and advantages of the present invention will become more clearly understood as a detailed description of a preferred embodiment is made with reference to the appended drawings in which.

DETAILED DESCRIPTION OF THE PREFERRED EMBODIMENTS

Figure 11:
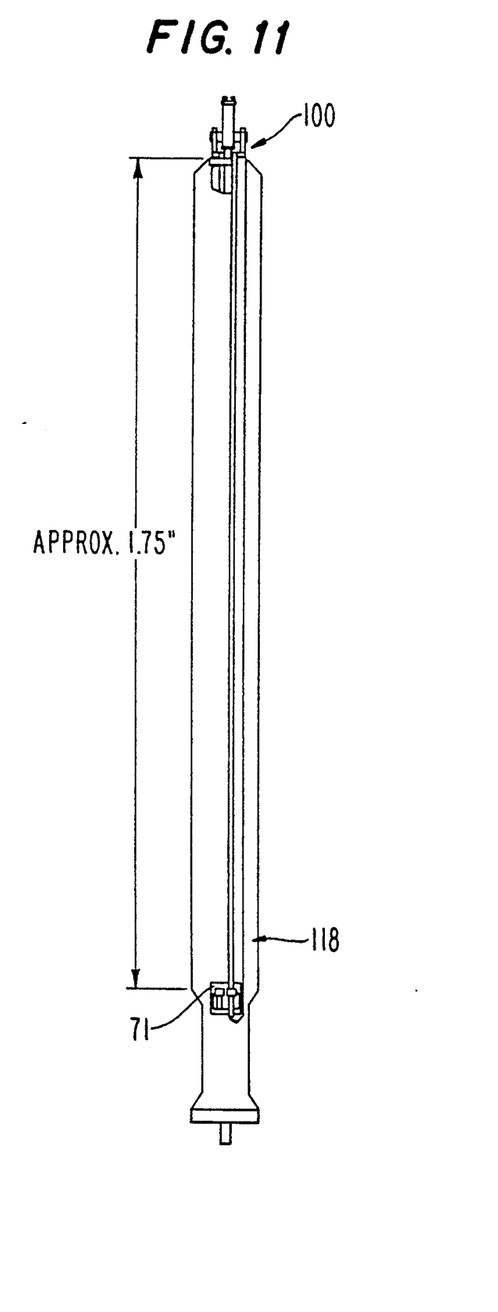
FIG. 11 is a side elevation showing the disposition of a tool according to the present invention, on a control rod.
Figure 12:
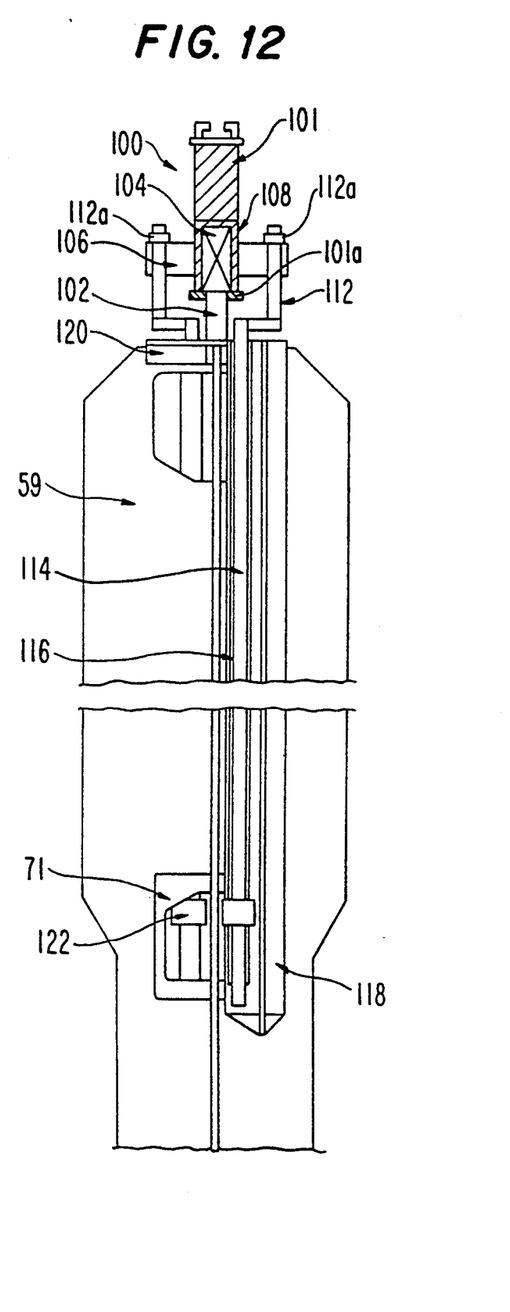
FIG. 12 is an enlarged view similar to that shown in FIG. 11 showing details of the cams and crank arm arrangements which characterize a first embodiment of the present invention.

FIGS. 11 to 28 show details of a first embodiment of the present invention. FIGS. 11 and 12 are side views showing the control rod latch tool 100 according to a first embodiment of the invention disposed in an operative position on a control rod 59. This arrangement comprises a pole adapter 101 which is arranged operatively engages a rigid pole (not shown) which extends down through the reactor vessel. The pole adapter 101 is rotatably supported on a stationary shaft 102 by way of a bearing 104. An actuator disc 106 is threadedly received on a threaded portion 108 of the pole adapter 101. The pole adapter is formed with a radially extending flange 101a at the bottom thereof to limit the downward movement of the actuator disc 106.

Figure 17:
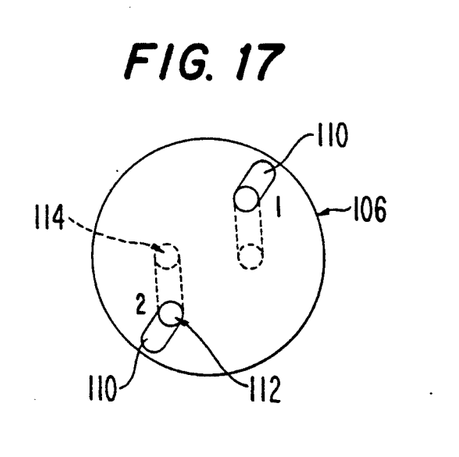
Figure 18:
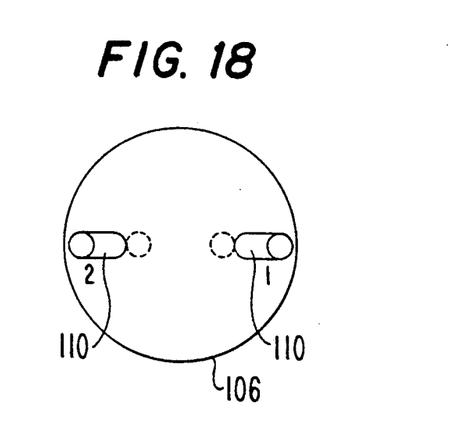
Figure 19:
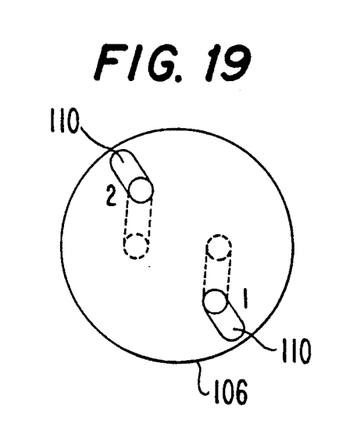
Figure 20:
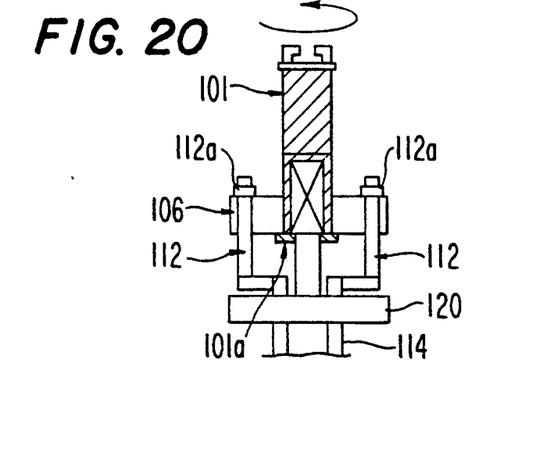
FIGS. 20 to 22 are side elevations, partially in section, which depict the three basic stages to tool operation.
Figure 21:
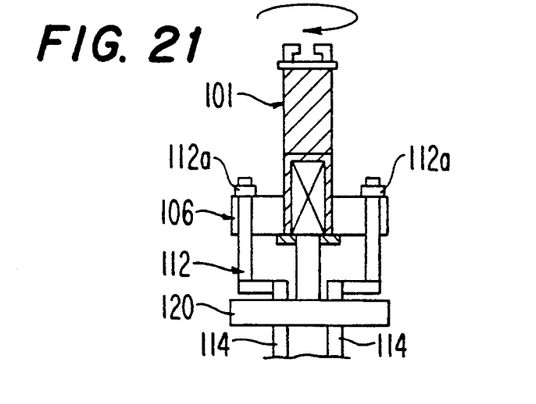
Figure 22:
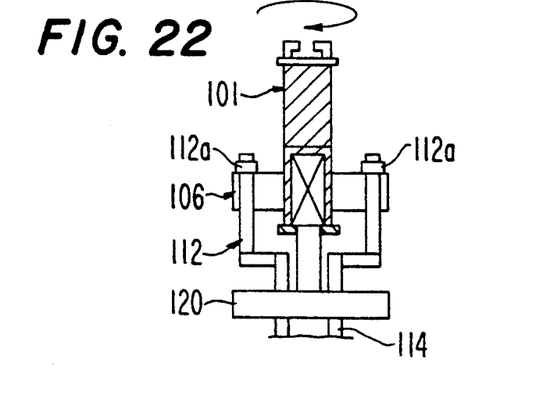
Figure 23:
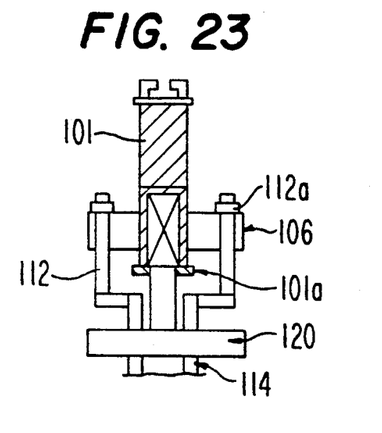
FIGS. 23 to 25 and FIGS. 26 to 28 are side elevation and plan views which demonstrate the positional relationship which develops between the actuator disc, the cranks and the actuator cams when the tool is conditioned to engage and lift, and disengage, respectively.
Figure 24:
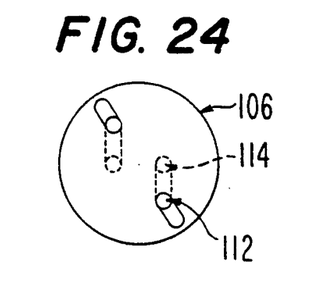
Figure 25:
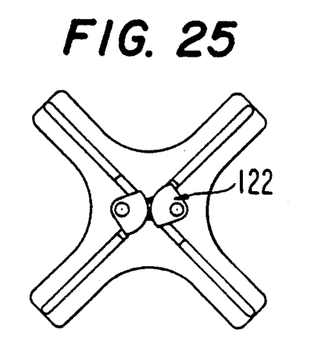
Figure 26:
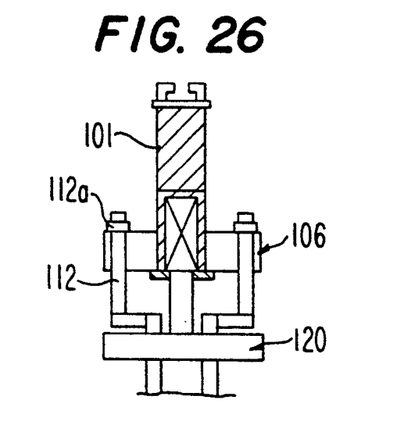
Figure 27:
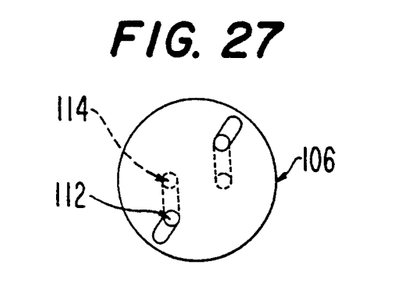

The actuator disc 106 is formed with two diametrically opposed elongate slots 110 (shown in FIGS. 17, 18 and 19 for example) which are arranged to receive cranks 112 formed at the upper ends of two elongate actuator rods 114. The upper end portions of the cranks 112 are provided with enlarged portions 112a which are larger in diameter than the width of the slots 110.

The actuator rods 114 are disposed through tubes 116 which are incorporated into reinforced V-shaped cross-section support structures or arms 118 which are associated with each of the actuator rods 114 and which extend down below the level of the unlatching handle 71. The upper ends of the support structures 118 are rigidly connected to an upper support structure and guide member 120 which is arranged to seat on the upper edge of the lifting handle 66.

Sector-shaped actuator members or "cams" 122 are fixed to actuator rods 114 near the bottom thereof. These so called cams 122 are adapted to swing synchronously with the rotation of the actuator rods 114 from the positions shown in FIG. 13 to those shown in FIG. 14 and vice versa. When the actuator cams 122 are rotated inwardly they enter the spaced defined below the unlatching handle 71 to positions wherein they are engageable with the lower edge of the handle. Additionally, in the "engaged" positions, a side edge of each of the cams 122 comes into contact with an inner edge 70a of a control rod blade 70 in a manner which limits further rotation of the cams in the engaging direction. This engagement produces a reaction which prevents the actuator rods from undergoing further rotation and thus also holds the actuator disc 106 against further rotation. Under these conditions, further rotation of the pole adapter causes the actuator disc 106, which is threaded to the outer periphery of the pole adapter 101, to thread its way up along the pole adapter 101 without undergoing any further rotation. Since the tops of the cranks 112 are provided with the enlarged portions 112a, the upward displacement of the actuator disc 106 is such as to draw the actuator rods 114 upwardly. In the present embodiment, the upward displacement which is possible with this arrangement, is selected to be about one inch (1") which is sufficient to lift the unlatching handle 71 sufficiently as to induce the release of the control rod 59 from the control rod drive.

In operation, the tool 100 according to the first embodiment of the invention is adapted to be lowered down through the reactor vessel 41 at the end of a rigid pole. The rigid pole is as mentioned above, connected to the tool 100 by way of the pole connector 101. The tool 100 is lowered through an opening 124 in a fuel support piece 126 until it rests on top of a control rod 59. In this position, the tool 100 straddles the control rod 59 diagonally with one actuator rod 114 and associated support arms 118, extending down along each side of the control rod 59. The upper end of the tool 100 is guided into position on top of the control rod 59 by the oppositely arranged support structures 118.

When the tool 100 is in position, the operator rotates a rigid pole adapter 101 by way of the non-illustrated rigid pole. This rotation induces the actuator disc 106 to rotate in synchronism therewith.

As the actuator disc 106 rotates with the pole adapter 101, the cranks 112 are displaced in a manner shown in FIGS. 16 to 19 and thus crank the actuator rods 114 to rotate through an angle of approximately 180°.

Figure 13:
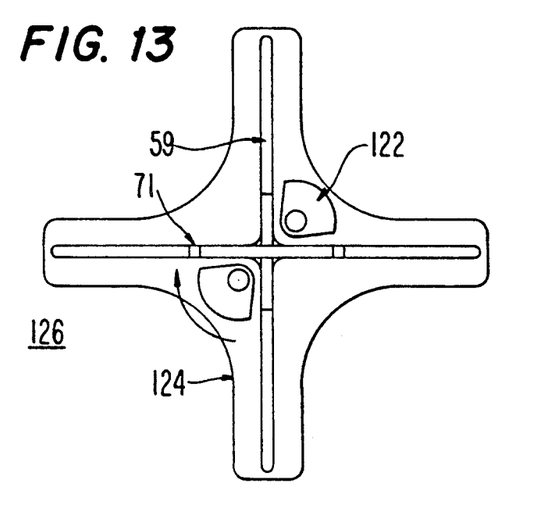
FIGS. 13 and 14 are plan views showing the cams which are used to actuate the unlatching handle, in disengaged and engaged positions, respectively.
Figure 14:
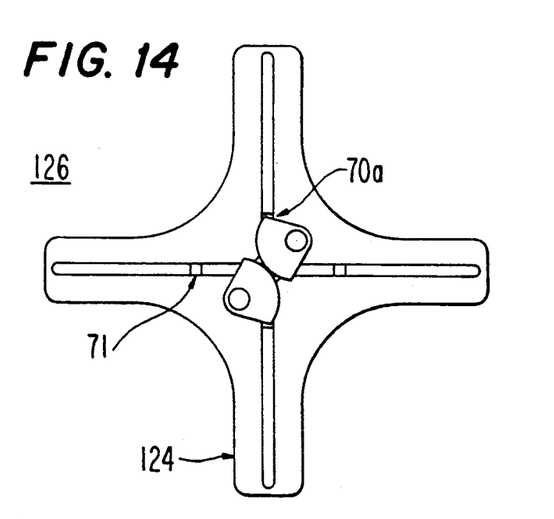
Figure 15:
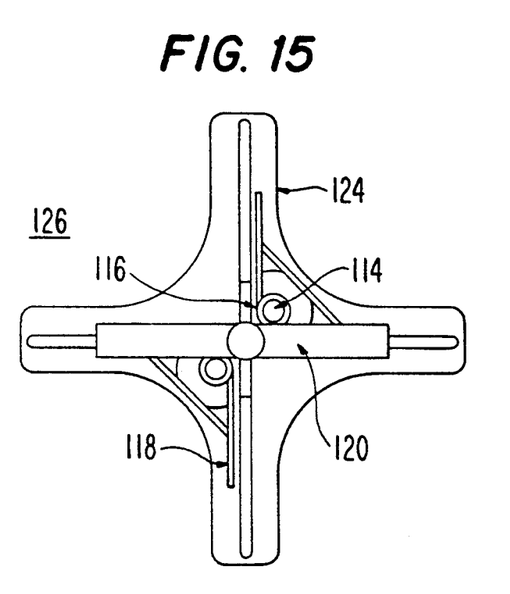
FIG. 15 is a plan view which shows the support structure for the actuator rods and cams.
Figure 16:
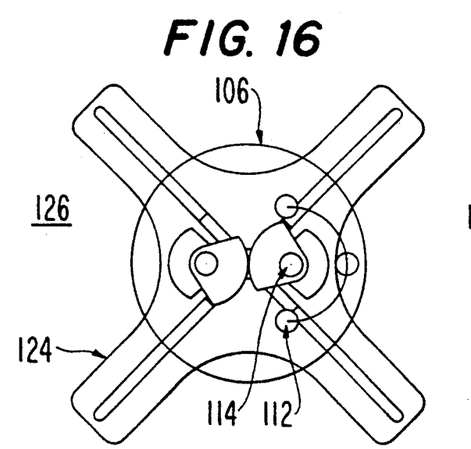
FIGS. 16 to 19 are plan views which show how the actuator cams are rotated from their disengaged positions to their engaged positions by the rotation of an actuator disc located at the upper end of the tool.

The actuator cams 122 which are fixedly secured to the actuator rods 114 near the lower ends of the same, rotate from the positions shown in FIG. 13 to those shown in FIG. 14 wherein they extend into the space defined by the unlatching handle 71.

Continued rotation of the rigid pole causes the actuator disc 106, which is held against further rotation in the same direction, to thread its way up along the threaded portion 108 pole adapter 101 and thus draw the actuator rods 116 and cams 122 upwards. This pulls the unlatching handle 71 upwards through the required distance of approximately 1 inch and thus releases the control rod 59 from the associated control rod drive.

Figure 28:
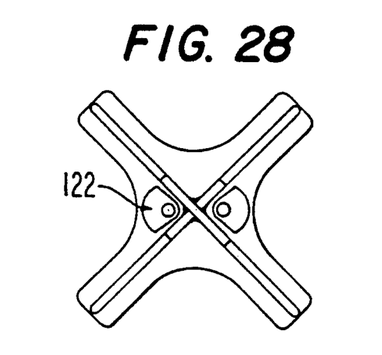

To release the handle, the tool operator turns the rigid pole in the other rotational direction so that the actuator disc 106 threads its way down along the pole adapter 101 thus lowering the actuator rods 114 and cams 122. When the unlatching handle 71 is lowered to its normal position, the actuator cams 122 become free to swing out from the control rod 59 in the manner depicted in FIGS. 23 to 28. More specifically, the unlatching handle 71 is provided with a return spring which is compressed by the lifting of the handle. This spring produces a bias which forces the lower edge of the unlatching handle 71 down against the tops of the actuator cams 122. This holds the cams 122 stationary while the pole adapter 101 is rotated in the release rotational direction, and thus enables the actuator disc 106 to thread its way down along the pole adapter 101 until the handle 71 is lowered to its normal locking position and before the cams swing out to the position illustrated in FIG. 28.

It is important in accordance with the present invention that the engagement and disengagement be performed in a controlled manner. The design of the tool ensures that the cranks move the cams to a disengaged position before the tool is moved away from the control rod 59, and also that the actuator cams are engaged before the lifting movement of the actuator rods begins. The upper ends of the cranks are designed so the operator can easily verify the engage/disengage movements from the refuel floor.

SECOND EMBODIMENT

A second embodiment of the invention is shown in FIGS. 29 to 32.

Figure 29:
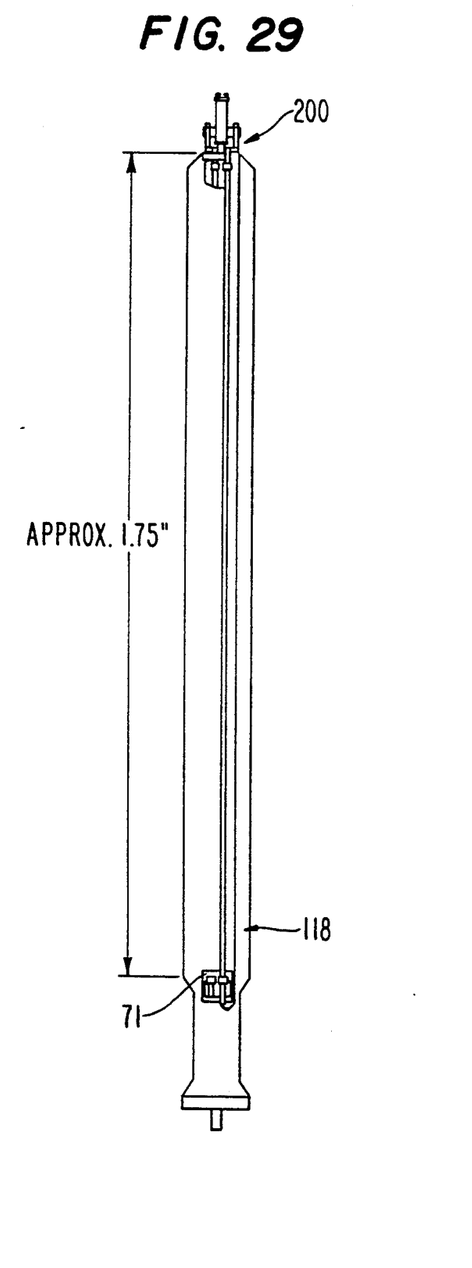
FIGS. 29 and 30 are side elevations which show a second embodiment of the present invention.
Figure 30:
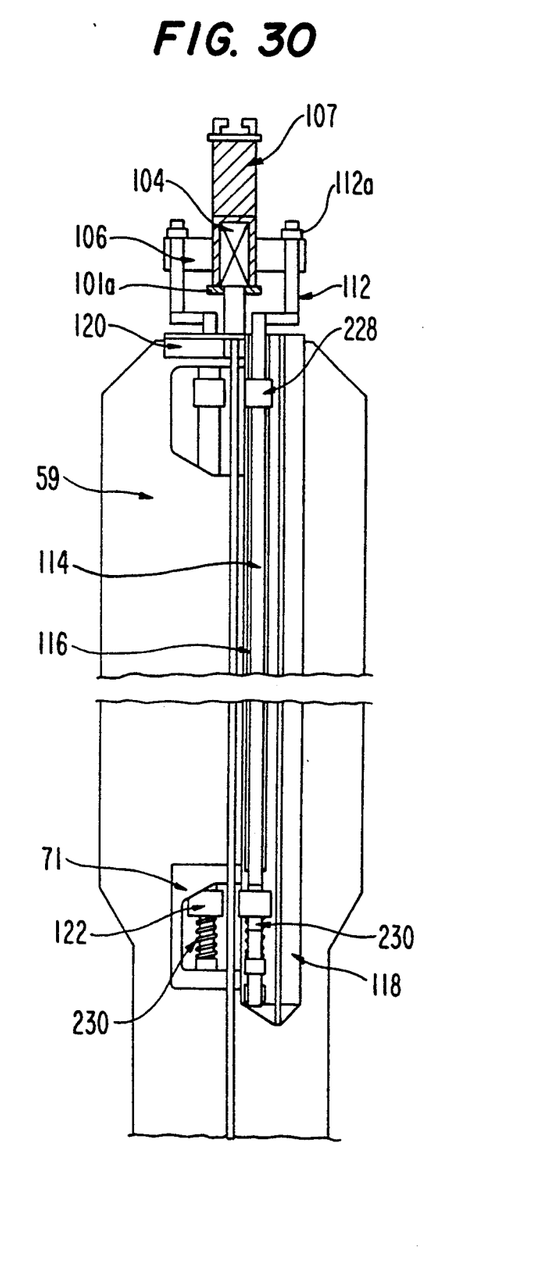
Figure 31:
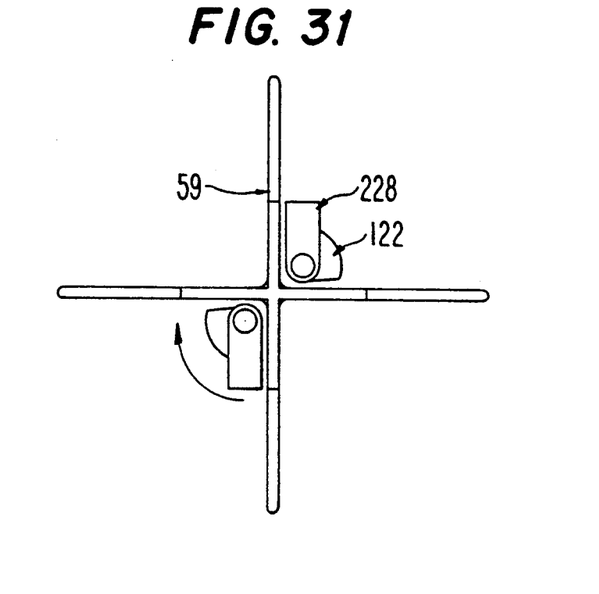
FIGS. 31 and 32 are plan view showing the positional relationship which, in accordance with the second embodiment of the present invention, develops between the actuator cams which are used to lift the unlatching handle and the cams which are used to engage the lifting handle of the control rod.

This embodiment differs from the first in that the tool 200 is modified to function as both a lifting tool as well as an unlatching tool. As will be appreciated from the figures, additional lifting "cams" 228 have been added to the actuator rods 114. These lifting cams 228 are arranged to swing synchronously with the unlatching actuating cams 122 and to enter the space defined by the lifting handle 66.

In this embodiment compression springs 230 are additionally provided below the actuating cams 122. The reason for this provision that, after the actuating cams 122 engage the unlatching handle 71, and the upward lift of the handle 71 is completed, it is necessary for the actuating cams 122 to be able slide through a short distance until the load of the control rod 59 is taken by the engagement between the lifting handle 66 and the upper set of lifting cams 228. The compression springs 230 ensures that the unlatching handle 71 is not overloaded as the control rod 59 is lifted by the upper pair of lifting cams 228 rather than the actuating cams 122. In this embodiment the unlatching cams 122 are prevented from rotating about the actuator rods 114 by means of keys or splines 230, which allow the cams 122 to undergo a limited amount of vertical displacement along the actuator rods 114.

Figure 32:
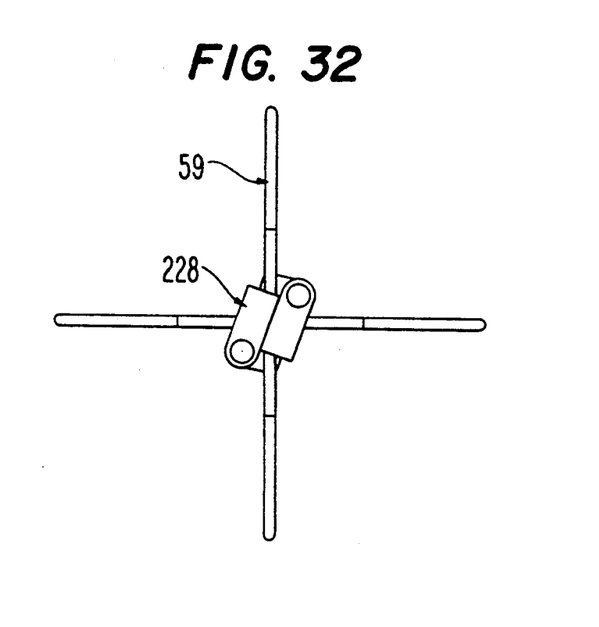

As will be appreciated from FIG. 32, the lifting cams 228 are arranged to engage one another below the lifting handle 66 at the same time as the unlatching actuating cams 122 reach their appropriate unlatching position below the lower edge of the unlatching handle 71.

It will be appreciated that even though only two embodiments have been disclosed and illustrated, various changes and modifications can be made without departing from the scope of the present invention. For example, it is within the scope of the present invention to provide the unlatching actuator cams with a sloped upper surface so that after a predetermined amount of rotation toward the engaged position, the upper surfaces of the cams begin to drive (viz., cam) the unlatching handle upward and thus obviate the need for threaded engagement between the actuator disc and the pole adapter to lifting the unlatching handle. It is further within the scope of the invention to provide a step down gearing between pole adapter and the actuator disc in order to increases the ease with which the pole adapter can be rotated.

Further alternatives involve using reverse angled surfaces which would allow the cams to be positively retained under the unlatching handle for lifting. The cams, particularly the upper ones which are used for lifting of the control rod per se, could benefit from such reverse sloped surfaces as this would induce the same to interlock with each other so ensure a higher degree of safety when lifting the control rods out of the reactor vessel. A further alternative which could be envisaged would be to form elongate narrow notches or recesses in the upper surface of the cams, in which the handles could be received to prevent any possible slippage.

The various other changes which can be implemented are believed to be self-evident to those skilled in the art to which the present invention pertains, in view of the preceding disclosure.

What is claimed is

1. A tool for unlatching control rods from a control rod drive, comprising:
    a rotatable adapter member;
    an actuator disc operatively connected with the rotatable member so that rotation of said rotatable adapter member induces rotation of said actuator disc, said actuator disc having an elongate slot formed therein; and
    an actuator shaft having a crank at a first end and a cam-like member at a second end, said crank being received in said elongate slot so that rotation of said actuator disc induces said actuator shaft to rotate and cause said cam-like member to rotate through a predetermined angle.

2. A tool as set forth in claim 1, wherein said actuator disc is threadedly received on a threaded portion of said rotatable adapter member so that upon a given resistance to the rotation of said actuator shaft being produced, said actuator disc threads its way along said threaded portion of said adapter member, said actuator shaft being adapted so that when said actuator disc threads its way in a first predetermined direction, said actuator shaft is axially displaced to move the cam to lift an unlatching handle of a predetermined apparatus.

3. A tool for use in a nuclear reactor and which can be lowered onto an essentially cruciform cross-section control rod having a lift handle at the top and an unlatching handle arranged near the bottom, said control rod being releasably connected with a control rod drive by a connection mechanism which is operatively connected with said unlatching handle, said tool comprising:
    first and second arms which extend down along opposite sides of said control rod from a cross-member which is seatable on the top of said control rod;
    first and second actuator rods which are supported on said first and second arms;
    first and second cam-like members which are fixed to said first and second actuator rods, respectively;
    a rotatable drive input member, rotatably mounted on said cross member; and
    crank means operatively interconnecting said input member with said first and second actuating rods, for selectively inducing said first and second actuator rods to rotate and to induce said first and second cam-like members to engage and lift said unlatching handle.

4. A tool as set forth in claim 3, further comprising third and fourth cam-like members, said third and fourth cam-like members being fixed to said first and second actuator rods, respectively, and arranged to engage said lifting handle when said first and second cam-like members engage said unlatching handle.

5. A tool as set forth in claim 4, wherein said first and second cam-like members are splined to said first and second actuator shafts, respectively so as to be slidable along predetermined portions of said first and second actuator shafts, said first and second cam-like members being biased by first and second springs to slide toward the upper ends of said predetermined portions.

6. A tool as set forth in claim 3, wherein said crank means comprises an actuator disc which is operatively connected with said rotatable drive input member, and crank portions which are formed at the upper ends of said first and second actuator rods and which are received in elongate slots formed in said actuator disc.

7. A tool as set forth in claim 6, wherein said crank portions are formed with enlarged portions which are larger in diameter than the width of the elongate slots formed in said actuator disc and which therefore enable the actuator disc to pull the first and second actuating rods to induce said cams to lift said unlatching handle when said actuator disc is axially displaced along said rotatable drive input member by operative connection established therebetween.

* * * * *